(12) United States Patent
Bass et al.

(10) Patent No.: US 6,367,897 B1
(45) Date of Patent: Apr. 9, 2002

(54) DOME-SHAPED BLANK FOR CLOSING AN INPUT-OUTPUT SLOT IN A PERSONAL COMPUTER

(75) Inventors: Timothy Scott Bass, Chapel Hill; Dean Fredrick Herring, Youngsville; William Fred Otto, Apex; John Robert Kirksey, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/632,682

(22) Filed: Aug. 7, 2000

(51) Int. Cl.$^7$ ............................................. A47B 97/00
(52) U.S. Cl. ................................. 312/223.2; 361/683
(58) Field of Search ......................... 312/223.1, 223.2, 312/265.6; 211/26, 41.17; 248/27.1, 27.3; 403/353; 206/719; 361/725, 726, 683, 686, 801, 816, 825

(56) References Cited

U.S. PATENT DOCUMENTS

| | | | |
|---|---|---|---|
| 3,156,282 A | * 11/1964 | Bedford, Jr. | ............ 403/353 X |
| 5,575,546 A | * 11/1996 | Radloff | ................. 312/223.1 X |
| 5,690,306 A | * 11/1997 | Roesner | ................... 361/683 X |
| 5,694,291 A | * 12/1997 | Feightner | ..................... 361/683 |
| 5,726,866 A | 3/1998 | Allen | .......................... 361/816 |
| 5,867,371 A | 2/1999 | Denzene et al. | ............. 361/816 |
| 5,947,571 A | * 9/1999 | Ho | ....................... 312/223.2 X |
| 6,102,501 A | * 8/2000 | Chen et al. | ........... 312/265.6 X |

* cited by examiner

Primary Examiner—James O. Hansen
(74) Attorney, Agent, or Firm—George E. Grosser; Andrew Dillon

(57) ABSTRACT

A blank for closing an input/output slot in the rear panel of a personal computer has an elongated body with a tab on one end and a flange on an opposite end. The body also has a large elliptical dome that protrudes rearward. A set of spring fingers extend along each side of the dome. The blank is installed in one of the input/output slots by first inserting the tab into a pocket below the slot. The dome is then pivoted into the slot until the fingers snap onto a pair of upright edges that define the slot. The blank is removed from the slot by pushing the dome in the opposite direction out of slot to overcome the flexible retention force provided by the fingers.

16 Claims, 6 Drawing Sheets

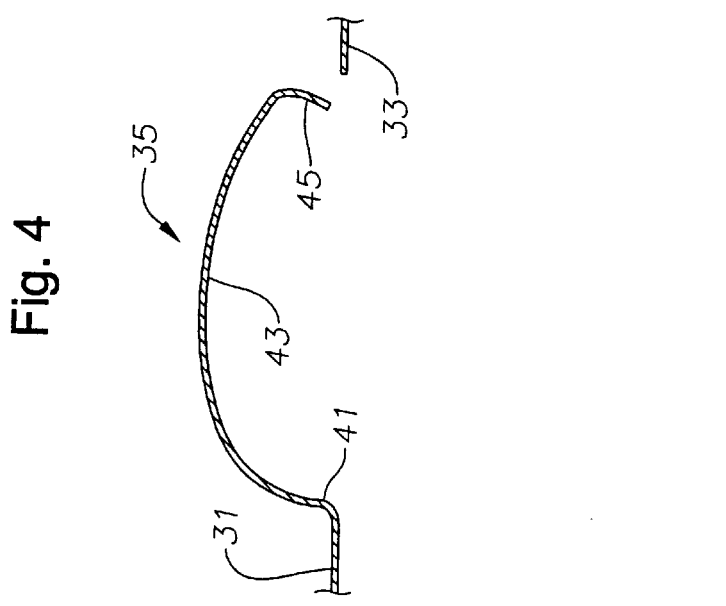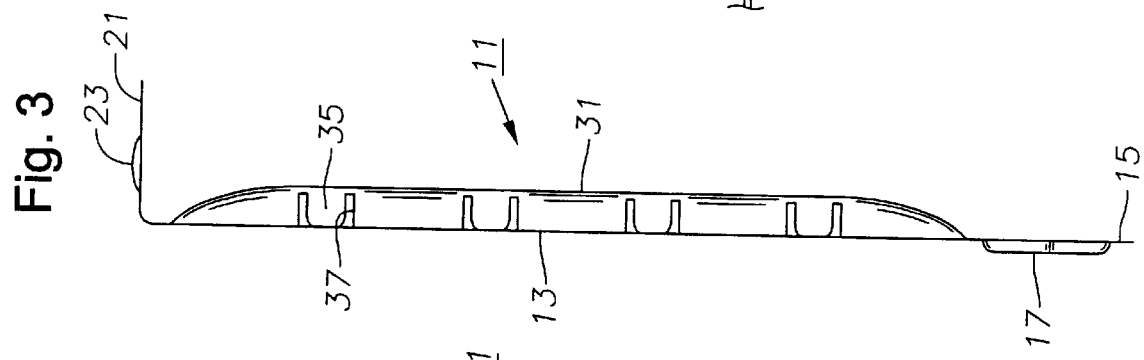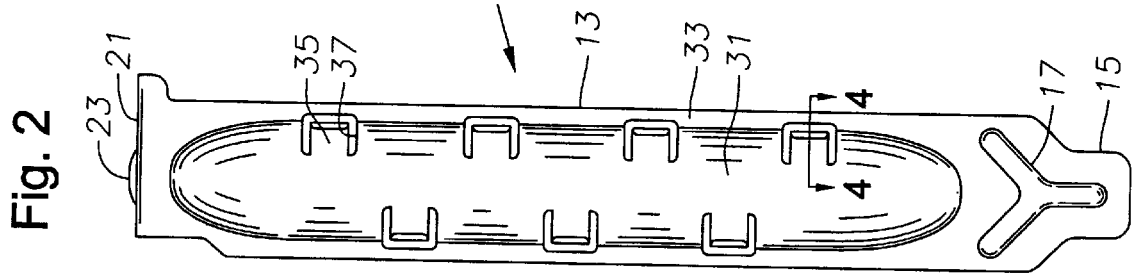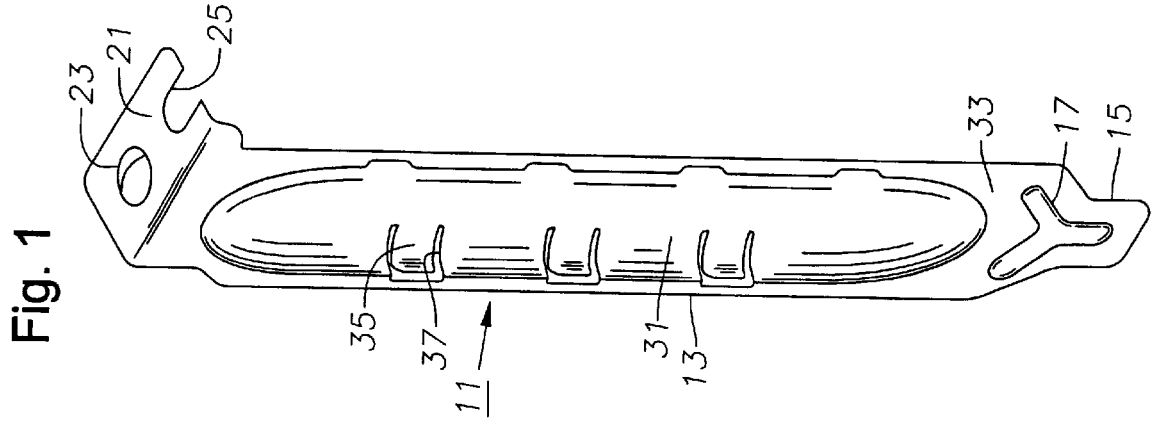

DOME-SHAPED BLANK FOR CLOSING AN INPUT-OUTPUT SLOT IN A PERSONAL COMPUTER

BACKGROUND OF THE INVENTION

1. Technical Field

The present invention relates in general to an improved apparatus and method for closing openings in a personal computer, and in particular to an improved blank for closing an opening in a personal computer. Still more particularly, the present invention relates to an improved blank for closing an input/output slot in the rear panel of a personal computer.

2. Description of the Prior Art

Personal computers typically have a rear panel that is provided with a number of open, generally rectangular holes or slots. The slots are provided for accessing various electrical components such as an input/output (I/O) card for graphics, modem, ethernet, etc. When a slot is not utilized, it must be closed or covered up for safety, environmental, and electromagnetic interference shielding reasons. In the prior art, devices for covering such slots either do not address all of these issues, or have geometries which protrude outside the opening to create additional safety-related issues. Moreover, some prior art slot covers or "blanks" have self-retention problems that require the use of screws or other secondary retaining mechanism. Other, prior art blanks also do not provide EMI grounding contact points. Thus, an improved cover or blank for closing the unused slots in the rear panels of personal computers is needed.

SUMMARY OF THE INVENTION

A blank for closing an input/output slot in the rear panel of a personal computer has an elongated body with a tab on one end and a flange on an opposite end. The body also has a large elliptical dome that protrudes rearward. A set of spring fingers extend along each side of the dome. The blank is installed in one of the input/output slots by first inserting the tab into a pocket below the slot. The dome is then pivoted into the slot until the fingers snap onto a pair of upright edges that define the slot. The blank is removed from the slot by pushing the dome in the opposite direction out of slot to overcome the flexible retention force provided by the fingers.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a front isometric view of one embodiment of a computer slot input/output blank constructed in accordance with the invention.

FIG. 2 is a front view of the blank of FIG. 1.

FIG. 3 is a side view of the blank of FIG. 1.

FIG. 4 is a sectional view of a finger on the blank of FIG. 1 taken along the line 4—4 of FIG. 1.

FIG. 9 is a rear view of the blank and rear panel of

DETAILED DESCRIPTION OF THE PREFERRED EMBODIMENT

Figure 5:
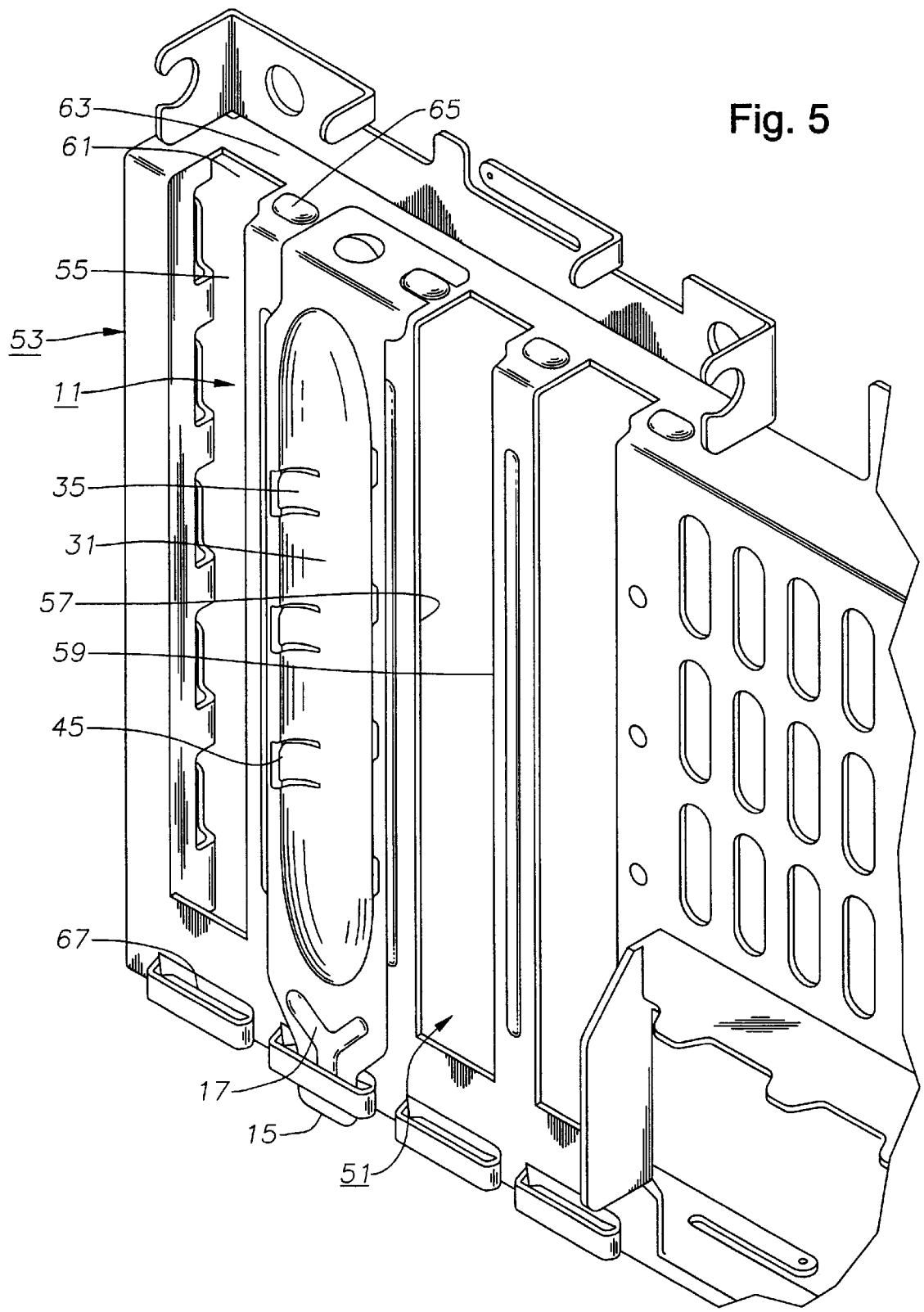
FIG. 5 is a front isometric view of the blank of FIG. 1 installed in a computer rear panel.
Figure 6:
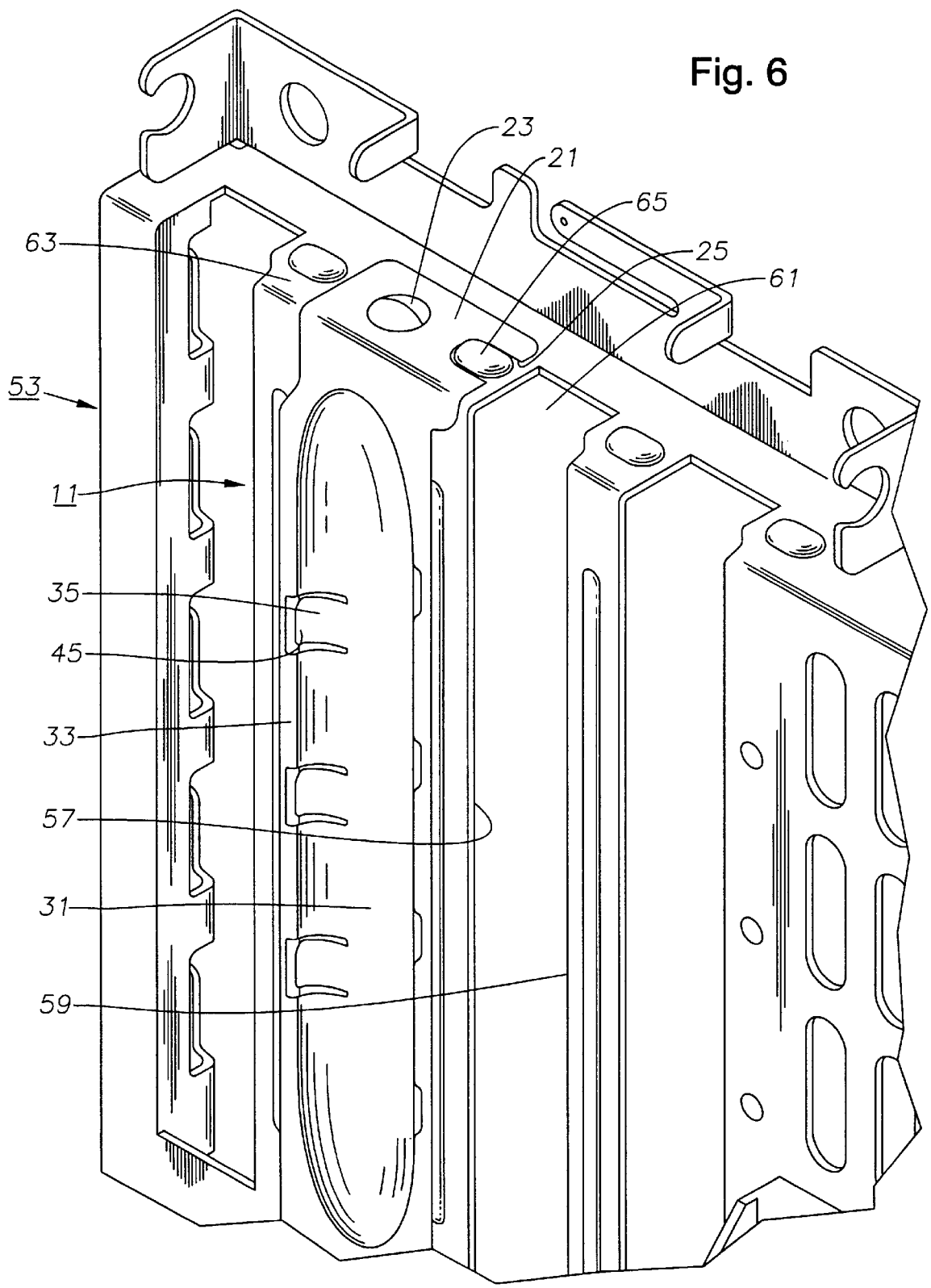
FIG. 6 is an enlarged isometric view of the blank and rear panel of FIG. 5.

Referring to FIGS. 1–3, one embodiment of a blank 11 for closing an input/output slot in the rear panel of a personal computer is shown. Blank 11 and all of its features described below are integrally formed and drawn from a single piece of thin spring steel in a closed volume geometry. Blank 11 has an elongated, generally rectangular body 13 that tapers to a tab 15 on a lower end. A raised feature or blister 17 is formed in tab 15 and protrudes from its front surface (FIG. 3). In the embodiment shown, blister 17 has a Y-shaped geometry. A flange 21 is formed at the upper end of body 13. Flange 21 extends rearward from body 13 and is substantially perpendicular thereto. Flange 21 has a semi-spherical blister 23 that protrudes above an upper surface thereof, and a semi-circular notch 25 (FIG. 1) formed along its right-side edge adjacent to blister 23.

Body 13 of blank 11 also has a large, protruding body portion or dome 31 formed therein that protrudes rearward from body 13. Dome 31 is a substantially elongated ellipsoid (FIG. 2) that extends in the longitudinal (vertical) direction of body 13. Dome 31 is concave when viewed from the front (FIG. 1) and convex when viewed from the rear or side (FIG. 3). Dome 31 is circumscribed on all sides by the generally flat perimeter 33 of body 13. Perimeter 33 defines the plane of body 13.

A plurality of spring snaps or fingers 35 are integrally formed in dome 31 and extend in a substantially radial direction from a longitudinal axis thereof. Each finger 35 is located within an enlarged rectangular hole 37 that extends between dome 31 and perimeter 33. Fingers 35 do not touch the sides of holes 37. In the embodiment shown, there are three finger 35/hole 37 combinations on the left side of body 13, and four finger 35/hole 37 combinations on the right side of body 13. As shown in FIG. 2, the combinations are vertically integrated such that they alternate from left to right. An enlarged top view of one of the fingers 35 is shown in FIG. 4. The base 41 of finger 35 is formed directly from dome 31 and is bent rearward. Base 41 transitions into a curved portion 43 that terminates in a short tab 45 that is bent forward back toward dome 31. A clearance is provided between tab 45 and perimeter 33 of body 13 such that they do not make contact.

In operation (FIGS. 5–9), blank 11 is installed in one of the input/output slots 51 in the rear panel 53 of a personal computer (not shown). In the particular application shown (which is merely illustrative), each slot 51 has a large, generally vertical opening 55 defined between two upright edges 57, 59 on rear panel 53. A short, generally horizontal opening 61 is formed in a perpendicular flange 63 that extends across the upper end of rear panel 53. Vertical opening 55 and horizontal opening 61 are contiguous with each other. A small elliptical bump 65 is formed adjacent to the right side of each horizontal opening 61 and protrudes thereabove. In addition, a slender pocket 67 is formed adjacent to the lower end of each slot 51 on the front surface of rear panel 53.

Figure 7:
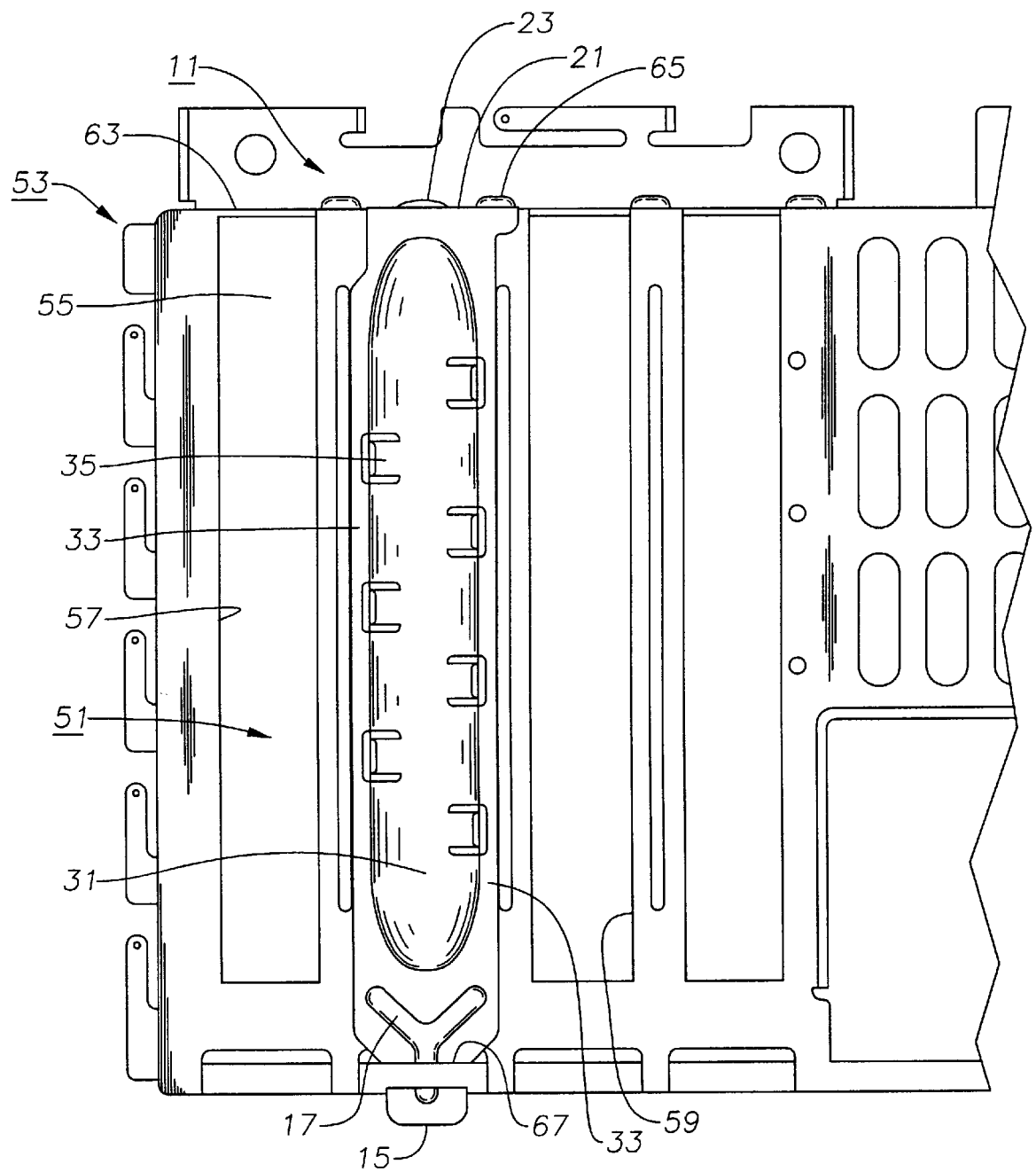
FIG. 7 is a front view of the blank and rear panel of FIG. 5.
Figure 8:
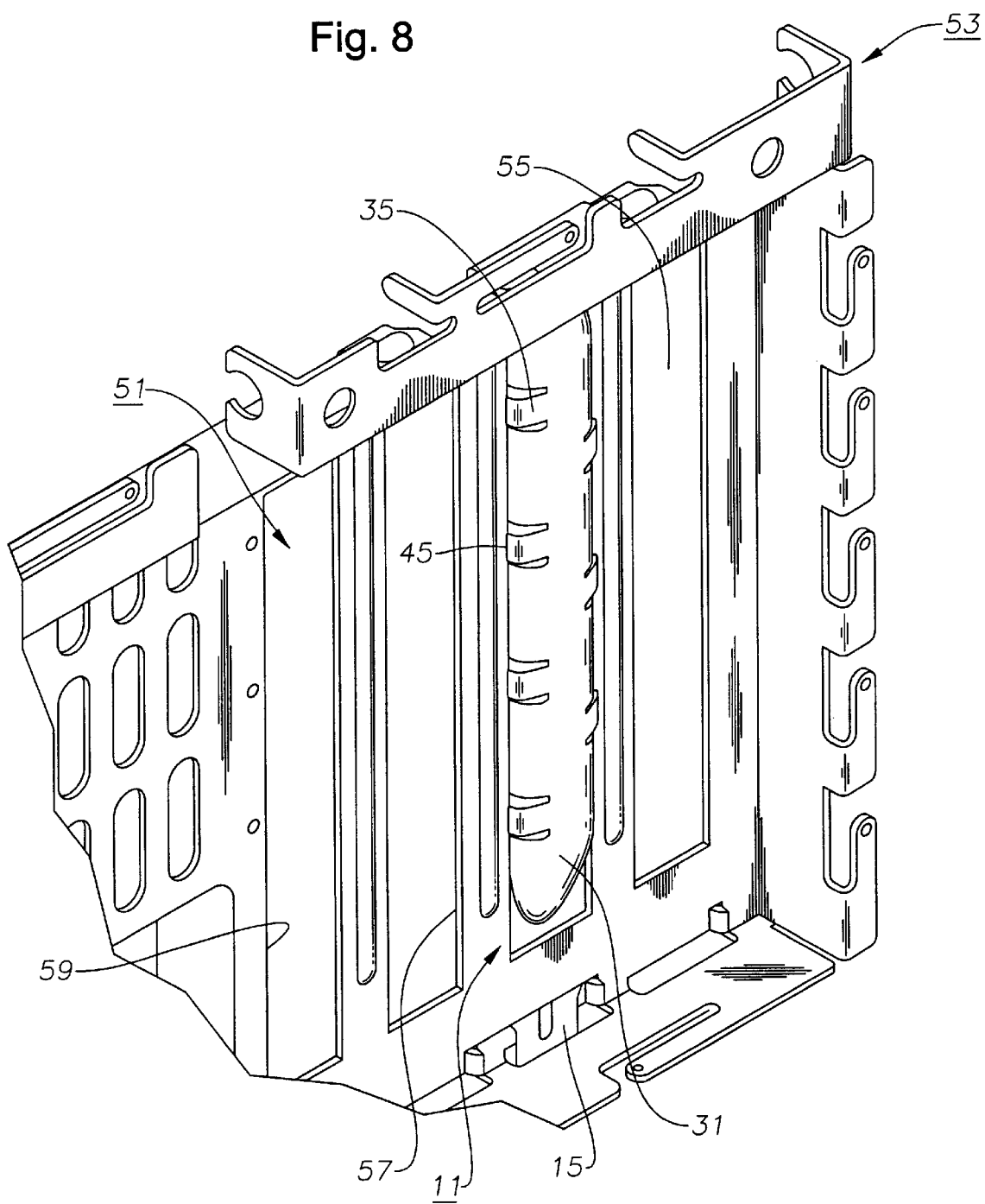
FIG. 8 is a rear isometric view of the blank and rear panel of FIG. 5.
Figure 9:
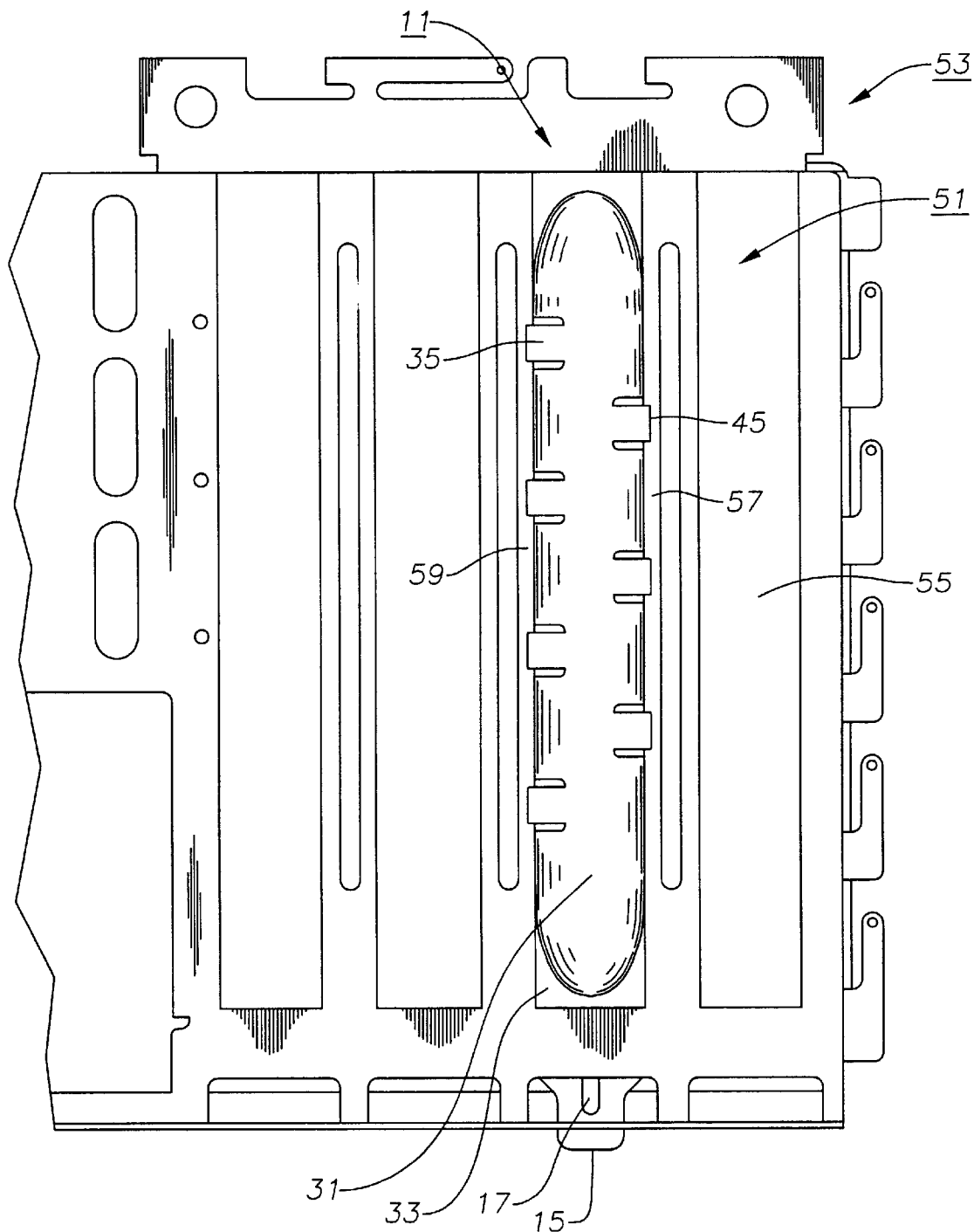

Blank 11 is mounted to slot 51 by first locating blank 11 on the front side of rear panel 53 with dome 31 facing rearward. When blank 11 is located adjacent to the selected slot 51, tab 15 is inserted downward into the pocket 67 located immediately below said slot 51 (FIGS. 5 and 7). The Y-shaped blister 17 provides blank 11 additional thickness such that tab 15 is closely received in pocket 67 to eliminate excessive movement therebetween. Dome 31 is moved rearward into vertical opening 55 of slot 51 until fingers 35 flex and snap into place on the rearward surfaces of upright edges 57, 59 (FIGS. 8 and 9). The tabs 45 on fingers 35 along the left side of blank 11 engage upright edge 57, while the tabs 45 along the right side of blank 11 engage upright edge 59. Dome 31 is closely received between upright edges 57, 59, with perimeter 33 flush-mount engaged against their front surfaces. When blank 11 is properly located, dimple 23 is seated in vertical opening 61 of slot 51, and bump 65 is located in notch 25 (FIG. 6) to assist with alignment. Blank 11 is simply removed from slot 51 by pushing dome 31 in the opposite (forward) direction out of vertical opening 55 to overcome the flexible retention force provided by fingers 35.

The present invention has several advantages. The fastenerless, domed-shaped I/O slot blank may be used in the rear panels of personal computers in lieu of I/O cards to fill the open hole at the back of the computer. The present invention addresses and solves safety, EMI shielding, and self-retention issues encountered using prior art I/O slot covers. The dome shape provides a closed volume geometry of thin spring steel. The domed shape allows the blank to protrude through the I/O slot and has spring snaps for retention and EMI grounding contact, and yet does not present any open geometry to the end used of the computer. The spring snaps are formed directly out of the spring steel of the dome and flex to allow the blank to be easily inserted or extracted from the rear panel of the computer without the use of additional fasteners.

While the invention has been shown or described in only some of its forms, it should be apparent to those skilled in the art that it is not so limited, but is susceptible to various changes without departing from the scope of the invention.

What is claimed is:

1. A blank for covering an open slot in a panel, wherein the slot is defined by first and second ends and a pair of edges, the blank comprising:

a generally elongated body having first and second ends and a protruding body portion therebetween;

a set of spring fingers extending from the protruding body portion; and wherein the blank has a mounted position wherein the protruding body portion is pushed in a first direction and extends through the open slot in the panel such that the spring fingers engage the edges defining the slot to retain the blank in the slot without the use of additional fasteners, and a released position wherein the blank is pushed in a direction opposite to the first direction to disengage the spring fingers from the edges.

2. The blank of claim 1 wherein the body is substantially rectangular and has a planar perimeter for flush mount engagement with the edges of the slot.

3. The blank of claim 1 wherein the protruding body portion is a generally elliptical dome.

4. The blank of claim 1 wherein each of the spring fingers have a curved portion that terminates in a tab for engaging one of the edges of the slot.

5. The blank of claim 1 wherein each of the fingers is located in a hole in the body portion.

6. The blank of claim 1 wherein the first and second ends of the body engage the panel adjacent to the first and second ends of the slot.

7. A blank for covering an open rectangular slot in a panel, wherein the slot is defined by a pair of side edges and has a vertical opening and a horizontal opening, and the panel has a pocket located opposite the horizontal opening, the blank comprising:

a generally elongated, rectangular body having a flat perimeter portion, first and second ends, and a protruding body portion therebetween;

a set of integral spring fingers extending from the protruding body portion, wherein each of the spring fingers is located in a hole in the protruding body portion; and wherein the blank has a mounted position wherein the first end of the body is mounted in the pocket, the second end of the body covers the horizontal opening, and the protruding body portion is pushed in a first direction and extends through the vertical opening such that the spring fingers engage the side edges of the panel to retain the blank in the slot without the use of additional fasteners, and a released position wherein the blank is pushed in a direction opposite to the first direction to disengage the spring fingers from the edges.

8. The blank of claim 7 wherein the flat perimeter portion of the body mounts flush against the side edges of the panel.

9. The blank of claim 7 wherein the protruding body portion is a generally elliptical dome.

10. The blank of claim 7 wherein each of the spring fingers have a curved portion that terminates in a tab for engaging one of the edges of the slot.

11. A computer panel, comprising:

a plurality of input/output slots each defined by first and second ends and a pair of edges;

a blank for covering at least one of the slots; wherein the blank comprises:

a generally elongated body having first and second ends and a protruding body portion therebetween;

a set of spring fingers extending from the protruding body portion; and wherein the blank has a mounted position wherein the protruding body portion is pushed in a first direction and extends through at least one of the open slots in the panel such that the spring fingers engage the edges defining the slot to retain the blank in the slot without the use of additional fasteners, and a released position wherein the blank is pushed in a direction opposite to the first direction to disengage the spring fingers from the edges.

12. The computer panel of claim 11 wherein the body is substantially rectangular and has a planar perimeter for flush mount engagement with the edges of the slot.

13. The computer panel of claim 11 wherein the protruding body portion is a generally elliptical dome.

14. The computer panel of claim 11 wherein each of the spring fingers have a curved portion that terminates in a tab for engaging one of the edges of the slot.

15. The computer panel of claim 11 wherein each of the fingers is located in a hole in the body portion.

16. The computer panel of claim 11 wherein the first and second ends of the body engage the panel adjacent to the first and second ends of at least one of the slots.

* * * * *